(12) United States Patent
Gadow et al.

(10) Patent No.: US 11,433,626 B2
(45) Date of Patent: Sep. 6, 2022

(54) METHOD FOR PRODUCING A COMPOSITE MATERIAL COMPONENT

(71) Applicant: Universitaet Stuttgart, Stuttgart (DE)

(72) Inventors: Rainer Gadow, Aschau am Inn (DE); Patrick Weichand, Grafenau (DE); Septimiu Popa, Stuttgart (DE); Andreas Killinger, Filderstadt (DE)

(73) Assignee: Universitaet Stuttgart

( * ) Notice: Subject to any disclaimer, the term of this patent is extended or adjusted under 35 U.S.C. 154(b) by 224 days.

(21) Appl. No.: 16/448,839

(22) Filed: Jun. 21, 2019

(65) Prior Publication Data
US 2019/0315074 A1    Oct. 17, 2019

Related U.S. Application Data

(63) Continuation of application No. PCT/EP2017/083823, filed on Dec. 20, 2017.

(30) Foreign Application Priority Data

Dec. 21, 2016  (EP) ..................... 16205876

(51) Int. Cl.
  *B29C 33/48* (2006.01)
  *B29C 70/30* (2006.01)
  *B29C 70/68* (2006.01)

(52) U.S. Cl.
  CPC ............ *B29C 70/305* (2013.01); *B29C 33/48* (2013.01); *B29C 70/68* (2013.01)

(58) Field of Classification Search
  CPC ....... B29C 70/305; B29C 33/48; B29C 70/68; B29C 53/825; B29C 53/821; B29C 53/82
  See application file for complete search history.

(56) References Cited

U.S. PATENT DOCUMENTS

| 6,346,030 B1* | 2/2002 | Morales .............. B81C 99/0095 451/28 |
| 2009/0023567 A1 | 1/2009 | Johner et al. |
| 2010/0038836 A1* | 2/2010 | Fisher, Jr. ........... B21C 37/0815 269/48.1 |

FOREIGN PATENT DOCUMENTS

| DE | 102008026313 | 12/2009 |
| WO | WO2006089519 A | 8/2006 |

OTHER PUBLICATIONS

Paredes, R.S.C., S.C. Amico, A.S.C.M. d'Oliveira, The effect of roughness and pre-heating of the substrate on the morphology of aluminium coatings deposited by thermal spraying, Surface & Coatings Technology, vol. 200 (2006), pp. 3049-3055. (Year: 2006).*
English translation of DE 103008026313 by Raimund Grothouse. (Year: 2009).*
English Translation of DE1020080263134B4, Published Dec. 2, 2009. (Year: 2009).*

(Continued)

*Primary Examiner* — Matthew J Daniels
(74) *Attorney, Agent, or Firm* — Forge IP, PLLC (57) ABSTRACT

The invention relates to a method for producing a composite material component, comprising the following steps: providing a negative mold, fine machining of the negative mold, applying at least one functional layer by means of thermal spraying to the negative mold, applying at least one fiber-reinforced plastic layer with a curable matrix material, curing the matrix material, and detaching the composite material component from the negative mold.

14 Claims, 5 Drawing Sheets

(56) References Cited

OTHER PUBLICATIONS

Agarwal, A., T. McKechnie, S. Seal, Net Shape Nanostructured Aluminum Oxide Structures Fabricated by Plasma Spray Forming, Journal of Thermal Spray Technology, vol. 12, No. 3 (Sep. 2003), pp. 350-359. (Year: 2003).*

* cited by examiner

METHOD FOR PRODUCING A COMPOSITE MATERIAL COMPONENT

CROSS REFERENCES TO RELATED APPLICATIONS

This application is a continuation of international patent application PCT/EP2017/083823, filed on Dec. 20, 2017 designating the U.S., which international patent application has been published in German language and claims priority from European patent application 16205876.2, filed on Dec. 21, 2016. The entire contents of these priority applications are incorporated herein by reference.

BACKGROUND

The invention relates to a method for producing a composite material component, comprising a fiber-reinforced plastic layer that is covered on one side with a functional layer.

Fiber-reinforced plastic materials, also known as fiber composite plastic materials, are regarded as materials that consist of a plastic matrix reinforced with fibers.

Frequently thermoplastics or duromeres/thermoset materials are used als matrix materials. Fiber-reinforced plastics with a thermoplastic matrix offer the advantage that they can be formed or welded subsequently. After cooling of the matrix fiber-reinforced plastics with a thermoplastic matrix are ready for use. However, there is the disadvantage that these plastic materials soften at elevated temperature. Also with an increasing fiber proportion the creeping tendency decreases. Fiber-reinforced plastics with a duroplastic matrix after the hardening or cross-linking of the matrix, respectively, cannot be formed anymore. By contrast to plastic materials based on thermoplastics these materials have a large temperature operating range. This is particularly true for hot-cross linking systems that are hardened at high temperatures. The temperature operating limit is determined by the location of the glass transition temperature. Fiber-reinforced plastics with a duroplastic matrix usually have higher strengths than have fiber-reinforced plastics with a thermoplastic matrix.

In a fiber-reinforced plastic the matrix surrounds the fibers that are bound to the matrix by adhesive or cohesive forces. Fiber-reinforced plastics usually have high specific stiffnesses and strengths. This makes them to be suitable materials for light weight applications. The mechanical and thermal characteristics of fiber-reinforced plastics can be adjusted by a variety of parameters. Apart from the fiber-matrix-combination for instance the fiber angle, the fiber volume fraction or the layer sequence can be varied.

A considerable disadvantage of fiber-reinforced plastics resides in the limited tribological and thermal durability under corresponding loads. By applying a functional layer that is tailored to the metallic, ceramic or cermet layer, these disadvantages can be counteracted.

In the prior art fiber-reinforced composite components and structures are covered with a functional layer that is applied by thermal spraying. This conventional method usually requires the following method steps:
1. Providing a fiber-reinforced plastic component;
2. surface activating of the present component by means of sand blasting, high-pressure water blasting, mechanical machining, laser structuring or chemical etching;
3. cleaning the substrate for removing grease, lubrication agents and blasting agent residues;
4. coating the substrate by means of thermal spraying; and
5. mechanical finish treatment (depending from the application, e.g. by means of grinding).

These process steps have some disadvantages.

The second process step serves to prepare for the coating of the fiber-reinforced plastic. In this step the surface of the fiber-reinforced composite component is roughened, to ensure later a sufficient mechanical clamping of the functional layer to the substrate, to reach an adhesive strength as large as possible. A disadvantage rests herein that a small surface activation leads to a bad adhesive strength between the functional layer and the surface of the fiber-reinforced component. Thus a detachment of the functional layer from the component may occur. On the other hand a thorough surface activation not only leads to the roughening of the polymer matrix material, but partially also to considerable damaging and defects within the fiber-reinforced plastic surface. The brittle fiber filaments partially are strongly damaged by the impinging blasting material and are removed. Thereby the mechanical strength of the fiber-reinforced plastic component deteriorates.

Frequently by this process no sufficiently high adhesive strength between the functional layer and the fiber-reinforced plastic substrate is reached. Inter alia the reason for this rests in the considerably different chemical and thermo-physical characteristics of the materials. As materials on the one hand a polymer matrix compound is used as a substrate and on the other hand a coating of a metallic, ceramic or cermet layer is used. An adhesion between these layers above all depends on a mechanical locking between the surfaces effected during application.

Apart from that during thermal spraying considerable damages are introduced into the substrate due to the process by means of the activation and coating processes, whereby the mechanical performance of the composite deteriorates.

A further disadvantage of this method rests in the high process temperatures and the partially very high kinetic energy during the coating (step 4). In this step the temperature sensitive polymer matrix (for instance epoxy resin) comes into contact with liquid melted metals or ceramic droplets, respectively, partially at very high velocity. Also this step has a negative impact onto the fiber composite material. Herein in particular the polymer matrix material is damaged due to the thermal and kinetic impact. Thereby disintegration reactions at the polymer surface result. Also an intensive cooling, which also increases the cost, does not provide the desired results. Also the differences between the coefficients of thermal expansion between fiber-reinforced plastic material and functional layer lead to the formation of high residual stresses. Thereby the lifespan of the component is reduced. In addition even a breakdown of the layer composite may result even without external forces.

From DE 10 2008 026 313 A1 a method for preparing a composite material component is known wherein initially a massive or a tube-shaped supplementary core is provided which subsequently at its surface is provided with a thermally sprayed coating. Thereafter on this surface a fiber material, which for instance may consist of carbon fibers, glass fibers or aramid fibers, is applied preferably by winding and is soaked or coated with not yet hardened matrix material of resin. The matrix material is hardened thereafter. Then the composite material component shall be obtained by fully removing the supplementary core by a machining method, e.g. by milling or turning, according to a first variant. According to a second variant a separating agent is utilized to a allow for a detaching from the supplementary core.

The known method may basically lead to an improvement, however the machining removal is very time and cost intensive. The variant that uses a separating agent on the one hand leads to disadvantages resulting from the separating agent which may interact with the surface of the thermal sprayed layer disadvantageously or may modify it. On the other hand the finish treatment of the thermally sprayed functional layer, that is to some extent necessary, is very costly and tedious. Also in particular with long and/or slim pipes such a final treatment is either very costly or even not possible.

SUMMARY

In view of this it is the object of the invention to disclose a method for producing composite material components that allow a manufacture of high-quality, coated light weight components, in particular also in the shape of pipes, in a simple and cost effective way.

According to one aspect of the invention there is provided a method for producing a composite material component comprising the following steps:
  (a) providing a negative form;
  (b) finish treating of the negative form at the surface thereof so that the surface of the negative form has a surface characteristic $S_a \leq 5$ μm and a surface roughness characteristic of $S_z \leq 80$ μm;
  (c) applying at least one functional layer by means of thermal spraying onto the negative form;
  (d) applying at least one fiber-reinforced plastic layer including a hardenable matrix material;
  (e) hardening of the matrix material; and
  (f) releasing the composite material component from the negative form to thereby obtain the composite material component.

According to the invention the loads that according to the conventional method occur by means of the surface activation and the coating on the fiber-reinforced plastic layer, are avoided.

According to the method according to the invention the producing of high-quality composite material components is made possible in a particularly simple and cost effective way. By the finish treatment of the surface on the one hand a detaching also of very long components is facilitated. On the other hand it is possible to obtain net-shape or near-net-shape components. A utilization of separating agents is not necessary to this end.

The finish treatment of the negative form preferably can be done by polishing, grinding and/or lapping.

The finish treatment allows for a simplified detachment of the composite material component from the negative form. The smoother the negative form is, the better the composite material component can be detached from the negative form.

According an aspect of the invention the final composite material component has a very low surface roughness, since the negative form is copied onto the composite material component or the functional layer, respectively, and the former was smoothened initially. Such a surface roughness according to the prior art can only be obtained by a tedious and cost intensive finish treatment.

According to another aspect of the invention the composite material component in particular can be detached easily, when the surface of the negative form has a surface characteristic of $Sa \leq 5$ μm, further preferred of $Sa \leq 3.5$ μm, particularly preferred of $Sa \leq 2.5$ μm, in addition preferably a surface characteristic of $Sz \leq 80$ μm, preferably $Sz \leq 50$ μm, particularly preferred of $Sz \leq 40$ μm.

The negative forms can be reused many times in a cost effective way.

The fiber compound plastics coated according to the invention have various applications. Components can be produced that are temperature resistant and/or corrosion resistant and that have advantageous tribological characteristics. In addition, such components are particularly lightweight, due to the fiber-reinforced plastic layer. Such components therefore can for instance be used as rolls in the paper industry or as CFK wheel rims. Such wheel rims can be used with bicycles as well as passenger cars. Such wheel rims in the case of bicycles may have a coated braking surface. When used as a wheel rim for a passenger car the rim base may possibly be coated for providing a thermal protection against a hot brake disk. Further fields of application are for instance within car manufacturing, wherein the components according to the invention may for instance be used as stone-chipping protection at the lower side of the car. Further applications may for instance be a thermal insulation layers, etc. According to the invention various shapes can be produced. Apart from the flat shapes also curved shapes, corrugated shapes, but also cylindrical and polygon shapes can be produced. In this way for instance tubes coated at the inner side can be made.

According to the invention within the component particularly good adhesive strengths between the individual layers can be reached. Sprayed layers that are applied onto fiber-reinforced plastics in a conventional way have adhesive strengths in the range of about 2-9 MPa. However, according to the method of the invention composite material components were produced that have an adhesive strength of >10 MPa.

By reversing the process steps in addition an improved advantageous adhesion between the functional layer and the fiber-reinforced plastic layer results. The functional layer due to the application method has a rough surface into which the low viscosity matrix material can penetrate and cure. Such a micro-clamping effects the adhesive strength between the individual layers positively. This cannot be reached by the conventional method. According to the conventional method in particular the still liquid molten functional particles penetrate into the roughened surface of the fiber-reinforced plastic.

According to the invention the layers that are applied by means of thermal spraying have a "generated" or "active" roughness, respectively. This surface roughness is reached by means of the thermal spraying process. However in the conventional method initially a suitable surface roughness must be produced, e.g. by sandblasting etc., so that a subsequent spray coating adheres. Thus this is a "necessary" or "passive" roughness of the surface.

According to the invention the composite material component comprises at least two layers, namely the functional layer and the fiber-reinforced plastic layer. The surface structure of the composite material component on the side of the functional layer is formed by replicating the negative form. A smooth "net-shape" surface is reached on the composite material component. Thereby particularly smooth surface structures can be produced, as well as surface structures that comprise textures or patterns. The surface structure of the composite material component on the side of the fiber-reinforced plastic layer primarily is governed by the application method of the fiber-reinforced plastic layer using a hardenable matrix material.

Using the method according to the invention composite material components can be produced that by contrast to prior art components do not have any damages between the layers, that for instance would be caused by surface activations or thermal spraying.

According to a further development of the invention the material of the negative form and the functional layer are selected in such a way that the difference ($\Delta\alpha$) of the coefficients of thermal expansion between the material of the negative form and the functional layer is larger than $1 \cdot 10^{-6}$/K, preferably larger than $2 \cdot 10^{-6}$/K, particularly preferred larger than $5 \cdot 10^{-6}$/K, mostly preferred larger than $10 \cdot 10^{-6}$/K.

According to a further development of the invention the material of the negative form and the functional layer are selected so that the difference ($\Delta\alpha$) of the coefficients of thermal expansion between the material of the negative form and the functional layer is smaller than $1 \cdot 10^{-4}$/K, preferably smaller than $6 \cdot 10^{-5}$/K, more preferred smaller than $4 \cdot 10^{-5}$/K, particularly preferred smaller than $3 \cdot 10^{-5}$/K.

By using a large difference $\Delta\alpha$ a good detachment from the negative form can be reached. On the other hand the difference should not be come too large to avoid delamination tendencies on the final composite material component or too large thermal tensions caused by temperature differences.

According to a further development of the invention the negative form before the application of at least one functional layer by means of thermal spraying is pre-heated, preferably to a temperature of at least 35° C., more preferred to at least 50° C., further preferred to at least 100° C., further preferred to at least 200° C., more preferred to at least 300° C., more preferred to at least 400° C., more preferred to at least 500° C., more preferred to at least 600° C.

By such a pre-heating on the one hand an improved structure of the thermally sprayed functional layer can be reached. On the other hand by such a pre-heating an improved later detachment from the negative form is made possible without a particularly large difference ($\Delta\alpha$) of the coefficients of thermal expansion between the material of the negative form and the functional layer being necessary, which possibly could impair the later integrity of the composite material component. The pre-heating must be seen independently from the heat introduction that occurs during thermal spraying and which within the frame of process control is counteracted by cooling operations.

According to the invention a "functional layer" is understood as a coating that provides particular characteristics to the composite material component for different applications. Examples for such applications can be corrosion protection, wear protection, the provision of sliding layers, electrical contacting or insulation, thermal insulation, etc. Possible materials that can be used for coating are in particular ceramics or cermets since they can effect a particular wear resistance, apart from basically also conceivable metallic materials. For generating corrosion protection layers for instance chemically stable materials can be used. In particular for the application as a wear protection abrasion-resistant materials are utilized that are resistant against shocks, abrasions, erosions and cavitations.

According to the invention the thermal spraying method is a method which according to DIN EN 657 is defined in the following way: "The thermal spraying comprises methods, wherein spraying additions within or out of spraying devices are partially melted on or off and are spun onto prepared surfaces. Herein the surfaces are not molten." Depending on the process herein different temperatures as well as different spraying velocities are reached which characterize the coating process to a large extent. The coating material is heated beyond the melting point within a flame, a plasma, a light arc, or with metallic materials also by means of induction coils beyond the melting point. Herein fine droplets are formed which subsequently are sprayed onto a surface. A feeding of the spraying material to the spraying system herein is performed as a wire, a rod, as powder, as a string, a suspension or with particular methods also as already molten material.

According to the invention "fiber-reinforced plastic layer" is understood as a layer which consists of a hardenable matrix material which is reinforced with fibers. After hardening of the matrix material, the fiber-reinforced plastic layer is configured as a fiber-reinforced plastic. Any kind of fibers can be used which give the hardened plastic the necessary strength and stiffness. The individual fibers for instance can be integrated as a yarn within a bundle in so-called rovings. This may facilitate the application of the fibers. In addition the individual fiber filaments may also be processed to semi-finished products such as by weaving, braiding, or stitching. Examples for semi-finished products can be webs, cores, embroideries, meshworks, mats, non-woven fabrics, fine-cuts, three-dimensional fabrics, etc. During processing the fibers may in addition be provided with a protection layer, the so called blackening. This blackening can facilitate an improved adhesion between the fiber and the matrix.

According to the invention the term "fibers" is understood to comprise individual fibers that can be applied in one or more layers, as well as processed fibers which can may be integrated as yarns, as well as semi-finished products on the basis of fibers or yarns of fibers, respectively.

The fibers may be short fibers, long fibers or continuous fibers that may be dispersed within the matrix material statistically or that may be arranged in a particular textured way to obtain certain characteristics that are direction dependent.

According to the invention the "hardenable matrix material" is a material which, when hardened, forms a plastic. The matrix material protects the fibers, provides the shape to the component and transmits occurring forces onto the fibers. As a matrix material thermoplastics, thermally set plastics, as well as elastomers can be used. The matrix surrounds the fibers within the fiber-reinforced plastic layer so that the fibers are bound to the matrix by means of adhesive or cohesive forces. Depending on the matrix that is used the fiber-reinforced plastic generated in this way has different characteristics. For instance the elasticity, the temperature operating range, the media resistance (acid, basic), the irradiation resistance (UV irradiation), the long-term behavior (creeping, relaxation), the moisture intake etc. can be tailored advantageously.

Depending on the application a suitable matrix material and a suitable fiber type are selected in combination to provide a suitable composite material component.

According to the invention "hardening" is understood so that volatile components that are present within the matrix material evaporate and the matrix can become fully cross-linked. During hardening various chemical reactions occur such as for instance polymer chain-reactions or condensation reactions. In the liquid phase the matrix material may penetrate into the layer present thereunder. During hardening of the matrix material than a physical mechanical binding, the so-called micro-clamping occurs. The rougher the surface into which the matrix material can penetrate, the better is the adhesion between the two layers. A hardening can for instance be accelerated by means of heating, by particular additions within the matrix material and by increased pressure.

In a preferred development of the invention after the step (c) and before the step (d) an adhesion mediator layer is applied, preferably by means of thermal spraying.

According to the invention an "adhesion agent layer" is an additional layer which possibly may be a material different from the functional layer as well as from the fiber-reinforced plastic layer. The adhesion agent layer serves to hold together the functional layer and the fiber-reinforced plastic layer materially by means of a highly adhesive binding. Which material is suitable as an adhesion facilitator depends on the one hand from the type of the functional layer and the fiber-reinforced plastic material layer as well as on the other hand from the particular application case. Such as a functional layer, as well as the fiber-reinforced plastic layer, also the adhesion agent layer must be tailored to each other. The adhesion agent layer should not be mixed up with a blackening that can provide an improved adhesion between the fiber and the matrix.

By applying an adhesion agent layer between the functional layer and the fiber-reinforced plastic layer onto the negative form better adhesion characteristics between the individual layers hereby can be reached. A detaching of the individual layers hereby can be avoided to a large extent. In addition by the additional layer further advantageous characteristics can be obtained. The characteristics result from the materials that are used as adhesion agents. For instance an improved abrasion resistance can be reached by applying metals, or metal alloys, respectively.

Due to the method according to the invention it is not necessary to pretreat the functional layer which is present below the adhesion agent layer, to ensure that the adhesion agent layer adheres to the functional layer. In addition, according to the invention a damaging of the fiber-reinforced plastic is avoided.

The adhesion agent layer according to a preferred development of the invention is made of a metal and/or a metal alloy, in particular of aluminum, nickel, steel, zinc, titanium, molybdenum, chromium, cobalt, silicon, alloys and/or mixtures thereof.

As a particularly preferred adhesion agent layer aluminum is suitable.

In case an adhesion agent layer from a layer of a good thermally conducting material, such as aluminum, is used, there is a further advantage in that an improved thermal distribution over the total composite material component results which is advantageous in particular at special applications with thermal loading.

Preferably, the functional layer and/or the adhesion agent layer are applied with a thickness of 20 to 1000 µm, preferably with a thickness of 50 to 500 µm, in particular preferably with a thickness of 100 to 200 µm.

The layer thickness determines the characteristics of the final composite material component to a large extent. The application of particularly thin layers for instance offers particular advantages with respect to the weight and the residual stress distribution within the compound. For a light-weight application particularly light components are preferred; thus components with thin layers that have the desired characteristics in spite of the thin layer thickness. Thin layer thicknesses have an advantageous effect on the cost. Such layers according to the invention preferably are applied by means of thermal spraying.

According to a further development of the invention the negative form is made of a material that is selected from the group consisting of metals, metal alloys, plastics, ceramics, salt or glass.

In particular with metals or metal alloys as a material for the negative form preferred differences $\Delta\alpha$ in the coefficients of thermal expansion between the negative form and the functional layer can be obtained, if a ceramic layer, such as aluminum oxide, is used as the functional layer.

The adhesion between the negative form and the functional layer primarily is reached by means of Van-der-Waals forces. Thus for the negative form a material should be used wherein the functional layer does not undergo reactions with the negative form. Thus materials are preferred that are chemically inert with respect to the materials that are used as functional layer.

Basically also temperature resistant plastic materials can be used. Examples for these plastic materials are polyetheretherketone (PEEK) or polyoxymethylene (POM). In addition, glasses can be used, in particular temperature resistant glasses, such as borosilicate glasses.

A particular advantage is provided by negative forms made of salt. These are salt cores that are used in the casting technology. Such salt cores may for instance be made of mixtures of different salts such as sodium carbonate ($Na_2CO_3$) and sodium chloride (NaCl). A negative form made of salt after the production of the composite material component can simply be rinsed off. Thus when utilizing salt as a material for the negative form the difference $\Delta\alpha$ is not important, since the negative form later is fully dissolved.

The negative form preferably has a rotationally symmetric shape, in particular in the shape a cylinder, further preferred a conical rotationally symmetric shape.

This embodiment offers the advantage that by such a rotationally symmetric shape of the negative form a tube coated on the inner surface can be produced. In addition by a conical rotationally symmetric shape the detachment of the composite material component after the full manufacture thereof is facilitated. Herein a conus inclination of 0.05° to 10° is preferred, further preferred of 0.1° to 1°.

During application of the fiber-reinforced plastic layer in addition a pressure tension can be generated (for instance by winding one fiber layer with a certain tensile stress) which acts from the outside onto the thermally sprayed functional layer provided inside. In this way the functional layer that is sensitive against a tensile stress is pre-stressed with pressure, so that in total a considerably higher strength, a higher damage tolerance and self-reinforcing effects of the final composite material component result.

In a further preferred development as a functional layer a metal layer, a ceramic layer and/or a cermet layer is applied.

By selecting the materials that are applied as a functional layer, the composite material component is provided with its special material characteristics. By means of the mentioned functional layers tribological, thermal and/or corrosive highly resistant composite material components can be made. Herein the functional layer may form a protective layer for the fiber-reinforced plastic layer.

According to a further development of the invention the application of the functional layer and/or the application of the adhesion agent layer is performed by means of thermal spraying that is selected from the group consisting of melting bath spraying, light arc spraying, plasma spraying, flame spraying, high velocity flame spraying, cold gas spraying, wire flame spraying, powder flame spraying, detonation spraying, suspension spraying, precursor spraying, and laser spraying.

Depending on the material which is used as the functional layer or the adhesion agent layer, the given methods offer specific advantages. For instance by light arc spraying electrically conducted materials can be sprayed.

According to a further development of the invention the application of the fiber-reinforced plastic layer is performed by means of a method that is selected from the group consisting of hand-laminating, fiber spraying, pressing, pultrusion method, injection molding, radial winding, cross winding, polar winding, resin injection method and autoclave method.

According to a further development of the invention the fibers are selected from the group consisting of organic fibers, inorganic fibers, metallic fibers, natural fibers and/or mixtures thereof.

As fibers according to the invention carbon fibers, glass fibers, basalt fibers, aramid fibers, polyester fibers, polyethylene fibers, nylon fibers, silicon carbide fibers, aluminum oxide fibers, mullite fibers, boron fibers, tungsten fibers, boron carbide fibers, boron nitride fibers, zirconium oxide fibers, steel fibers and/or mixtures thereof can be utilized.

Depending on the fiber type used one of the application methods mentioned above may be advantageous. The respectively selected fiber type gives the characteristic strength as well as elasticity to the final composite material component.

According to a further development of the invention the fibers are soaked within a hardenable matrix material.

According to the invention the fibers for instance can be soaked within a hardenable matrix material and thus can be applied as soaked fibers. Alternatively the fibers can also be applied "dry" and can only be soaked subsequently with a hardenable matrix material. In addition also the fibers may be mixed with matrix material. For instance short fibers can be mixed within the matrix material and can be applied together therewith. Depending on the fiber type one of the alternatives may be advantageous. For instance particularly long fibers may be drawn through a bath of matrix material during application and may be subsequently wound onto the negative form.

According to a further development of the invention matrix material is a resin.

Resins that can be used according to the invention are for instance epoxy resins, unsaturated polyester resins, vinyl ester resins, phenol formaldehyde resins, diallylphtalate resins, methacrylate resins, polyurethane resins, amino resins, in particular melamine resins, urea resins, geopolymers, benzoazine resins, phenole resins, bismaleimide resins, polyimide resins, cyanester resins and/or silicon polymers, such as for instance polysilanes, polycarbosilanes or polytitanosilanes. These resins offer the advantage that they can be hardened and that they can join well with the fiber. In addition they offer the advantage to be particularly resistant.

According to the invention the resins may further contain filler materials. Filler materials are additive materials that alter particular characteristics of the resins, such as the hardness and abrasion resistance, the chemical, mechanical, thermal and electrical characteristics. The cross-linking of the resins should preferably not be impeded by the addition of filler materials. Filler materials differ from each other by their composition, structure and density.

Filler materials that according to the invention can be utilized are for instance organic filler materials (e.g. natural fibers, such as cotton, jute, hemp, sisal etc.), inorganic filler materials (e.g. glass fibers, hollow glass spheres, metal powder etc.) fibrous filler materials (e.g. glass fiber chips, cotton chips), powderous filler materials (e.g. quartz frit, talcum, chalk etc.), thixotropic agents, color pigments and/or flame protective agents.

According to a further development of the invention the fiber-reinforced plastic layer is applied with a thickness of $\geq 500$ µm, preferably of $\geq 700$ µm, particularly preferred of $\geq 900$ µm, wherein the thickness preferably is 5 cm at the most.

By applying particularly thin plastic layers particularly light composite material components can be produced. This may e.g. be utilized in the automobile manufacture, car manufacture, and in the machine manufacture. Depending on the application profile of the composite material component also a thicker plastic layer may be preferred, whereby for instance a higher strength can result.

By means of the method according to the invention particularly long and light tubes coated on the inner side can be produced. In general these may have a diameter of few millimeters up to several meters. One possible application is an application as a conveyor tube, for instance for conveying liquid concrete. Thereby a considerable weight reduction can be reached when compared with steel tubes used in the prior art.

According to a further development of the invention the negative form is cooled to facilitate a detachment of the composite material component.

By cooling the negative form the material thereof retracts so that a gap between the functional layer of the composite material component and the surface of the negative form results. Thus the composite material component can be obtained by a simple tearing off. A cooling can for instance be performed by means of carbon dioxide or liquid nitrogen.

According to a further development of the invention after the step (e) or after the step (f) an elastomer layer is applied.

This layer can for instance consist of rubber, natural rubber, polyurethane, polyurea etc. According to the invention the elastomer layer can be applied before or after detaching the composite material component. This layer offers the advantage that the final composite material component can for instance be protected against shock loads. One possible application are for instance concrete conveyor tubes used on construction sites.

According to a further development of the invention before the step (c) a connection element is applied to the negative form or before the step (d) a linking element is applied onto the coated negative form.

The "connection element" for instance may be configured as a flange, a coupling or a linking element. These for instance may consist of metals, such as steel, aluminum and titanium. By means of this design composite material components can be produced that can be connected with further components. For instance tubes that are produced according to the method according to the invention can be connected with flanges and can be sealed.

According to the invention the connection elements can already be provided on the negative form, so that these within the method according to the invention are at least partially also coated. In addition the connection elements after the generation of the thermally sprayed coating (functional layer or adhesion agent layer) can be applied to the negative form. Herein the connection element is at least partially included within the fiber-reinforced plastic layer. Particularly preferred is the application of the connecting elements at the ends of the negative form. Thereby composite material components are produced which can more easily be connected at the respective ends thereof.

The object of the invention is also solved by a composite material component having a thermally sprayed functional layer and a fiber-reinforced plastic layer wherein the thermally sprayed functional layer has a surface characteristic of $S_a \leq 3.5$ µm and $S_z \leq 50$ µm, in particular $S_a \leq 2.5$ µm and $S_z \leq 40$ µm, which preferably is produced according to the method described above, wherein preferably it is configured as a tube coated on the inner side, preferably having an inner diameter of ≤1000 mm, preferably of ≤500 mm, ≤200 mm, further preferred having an inner diameter of ≥10 mm. Herein a length of several meters can be utilized.

The surface characteristics $S_a$ and $S_z$ are characteristics that provide information with respect to the surface characteristics or roughness, respectively. The two figures are 3D-amplitude characteristics. The $S_a$ is an arithmetic mean, while the $S_z$ value provides the maximum height of the surface texture.

The surface roughness of the sprayed functional layer is governed in particular by the negative form and the material used for the functional layer. Depending on the composition of the negative form this is mapped onto the functional layer. Such smooth surfaces according to methods known in the prior art can either be not produced at all or only at very high effort.

In addition according to the invention very long tubes coated on the inside having a small diameter can be produced. According to the prior art it is only possible to produce tubes coated on the inside using a coating lance or by means of an inner burner or by means of a coating robot, respectively. These methods however are limited with respect to the length and to the diameter of the tube to be produced. In addition according to the prior art no tubes having a particularly smooth functional layer at the inner surface can be produced, since there are no suitable treatment methods for mechanical treatment of the inner surfaces of thin tubes. The method according to the invention however allows to manufacture inter alia particularly thin as well as particularly smooth, long tubes of several meters length that are coated on the inside.

It will be understood that the aforementioned features of the invention and the features to be mentioned hereinafter cannot only be used in the given combination but also in different combinations or independently from each other without leaving the scope of the invention.

BRIEF DESCRIPTION OF THE DRAWINGS

Further features and advantages of the invention can be taken from the subsequent description of preferred embodiments with reference to the drawings. In the drawings show.

Figure 1:
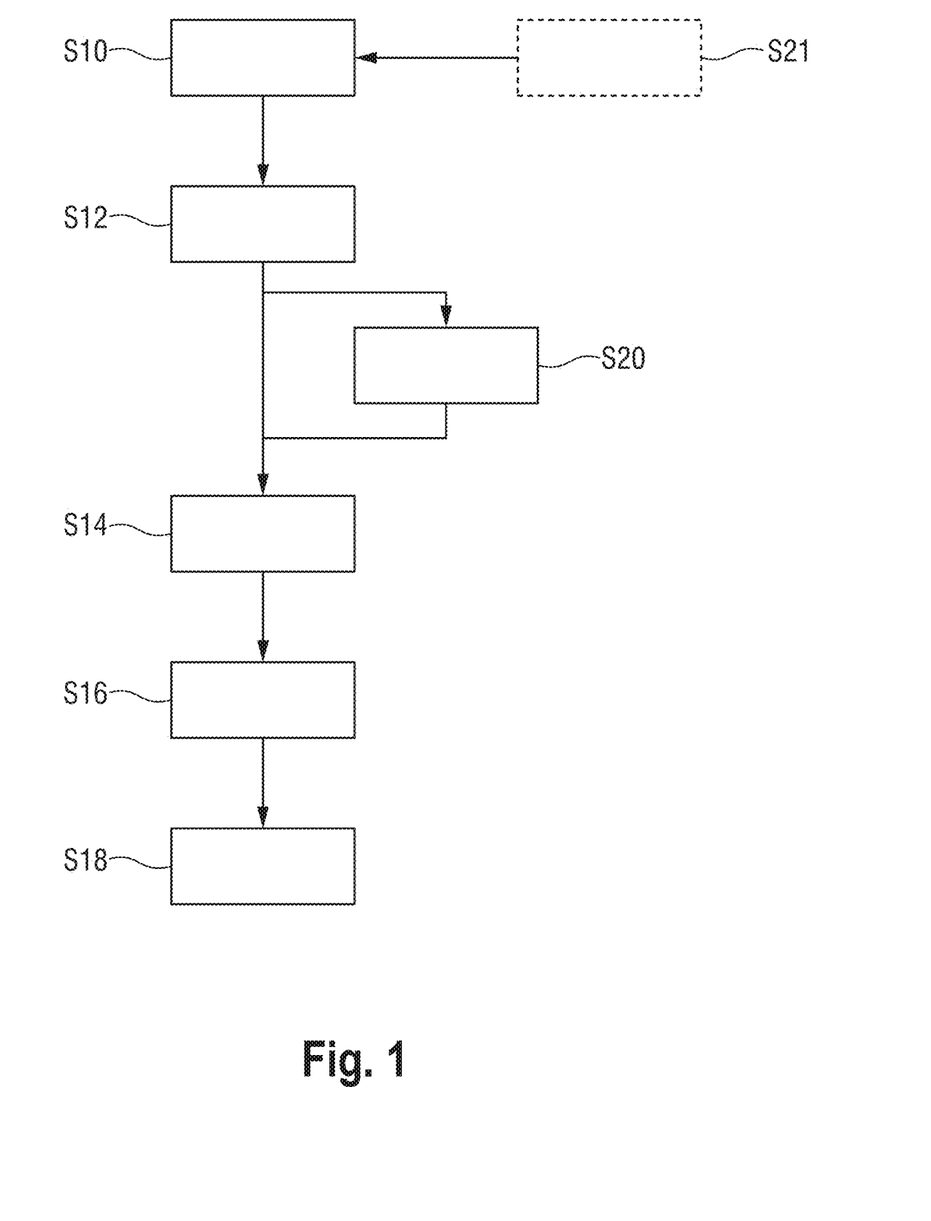
FIG. 1 the fundamental process procedure for the production of composite material components according to the method of the invention.

The fundamental steps of the method according to the invention for producing composite material component are shown schematically in FIG. 1. It is a six-stage method (S10, S12, S14, S16, S18 and S21). This method can be further augmented by additional method steps (S20). The composite material component may be a fiber-reinforced plastic which is provided with a coating, the functional layer.

In the first step S10 a negative form is provided. This may be a rotationally symmetric shape. Other shapes, such as for instance polyhedrons having several sides, are also possible. In a further preferred configuration the negative form is a conical form. These forms facilitate the later detachment of the negative form in the step S18. The negative form determines the shape of the final composite material component to a large extent. If the negative form is for instance a cylinder, then a composite material component in the shape of a tube can be produced. Flat forms are also possible according to the invention.

The surface of the negative form determines the surface structure and the roughness of the functional layer of the composite material component, since this form is mirrored. A pattern or texture is thus possible.

In an additional step, which is performed before the thermal spray coating (S12), the negative form is finish-processed, see step S21 (dashed box). Herein the form is for instance polished, grinded or lapped. This treatment facilitates the detachment in step S18. In addition in this way a composite material component having a particularly smooth functional surface (net-shape) can be produced.

The materials from which the negative form can be made are preferably metals or metal alloys. These metals allow a simple and cost effective preparation of the negative forms. The materials also have the advantage that the negative forms can be reused many times. The material of the negative form is tailored to the material of the functional layer, in particular by selecting Δα. Preferably for instance an aluminum alloy with an α of about $25 \cdot 10^{-6}$/K can be used for the negative form, for instance in combination with an $Al_2O_3$ coating having an α of about 7 to $9 \cdot 10^{-6}$/K, leading to a Δα of $>15 \cdot 10^{-6}$/K.

When using a steel core (stainless steel) with a functional layer of $ZrO_2$ a Δα of $>2 \cdot 10^{-6}$/K results. Using a steel core with a functional layer of $Al_2O_3$ leads to a Δα of $>5 \cdot 10^{-6}$/K. As far as not indicated differently, the coefficients of thermal expansion α are to be understood in the range of 20° C. to 300° C.

The step S10 is followed by the finish treatment (step S21), e.g. by grinding or polishing, to obtain a smooth surface. Herein an Sa-value of <3.5 μm and a Sz-value of <50 μm is set.

The step S21 is followed by the application of at least one functional layer by means of thermal spraying onto the negative form (step 12). The functional layer preferably is a ceramic layer and/or a cermet layer.

The functional layer is a coating that protects the layer/layers in the final composite material component against outer influences and provides particular characteristics thereto. For instance the functional layer serves the purpose of corrosion protection, wear protection, etc.

According to an alternative method between the steps S21 and S14 an optional method step S20 is introduced. Herein an adhesion agent layer is applied, preferably by means of thermal spraying. The adhesion agent layer serves to hold together the functional layer and the fiber-reinforced plastic layer as far as possible by material connection using a highly adhesive binding. Depending on the material of the functional layer and the fiber-reinforced plastic layer this step may be dispensed with. In particular, when the functional layer adheres to the fiber-reinforced plastic layer strongly. By the method according to the invention a further improved adhesion can be reached by the penetrating of the matrix material into the outer regions of the functional layer.

The adhesion agent layer consists of metals or a metal alloy, in particular of aluminum, nickel, steel, zinc, titanium, molybdenum, chromium, cobalt, silicon, alloys and/or mixtures thereof.

It will be understood that several functional layers, or adhesion agent layers, respectively, can be applied one over the other.

The functional layer and possibly the adhesion agent layer are applied by means of thermal spraying. Herein the material to be applied is molten within or out of a spraying device and is thrown onto the prepared surface. For instance melting bath spraying, light arc spraying, plasma spraying, flame spraying, high velocity flame spraying, cold gas spraying, wire flame spraying, powder flame spraying, detonation spraying, suspension spraying, precursor spraying, or laser spraying can be applied.

The layer thickness of the thermally sprayed layers may be between 20 to 1000 μm, preferably between 50 to 500 μm, in particular preferred between 100 up to 200 μm. By means of the thermal spraying particularly smooth and thin layers can be applied.

After applying at least layer onto the negative form in the following method step S14 at least one fiber-reinforced plastic layer is applied. The application of the fiber-reinforced plastic layer can be performed onto the functional layer or possibly onto the adhesion agent layer.

The fibers of the fiber-reinforced plastic layer may be organic fibers, inorganic fibers, metallic fibers, natural fibers and/or mixtures thereof, while the matrix material preferably is a resin. In addition, the fibers may also be processed fibers, i.e. such fibers that are woven, non-crimped, stitched or plaited. In addition the fibers may also be semi-finished products, based on fibers or yarns of fibers, respectively, but also short fibers.

The fibers may be applied onto the functional layer, or the adhesion agent layer, respectively, by hand-laminating, fiber spraying, pressing, pultrusion methods, injection molding, radial winding, cross winding, polar winding, resin injection methods or autoclave methods. In an alternative design the fibers may be soaked within a hardenable matrix material. This allows for a simultaneous application of fibers and matrix material. Alternatively the last applied layer (adhesion agent layer or functional layer) can be soaked with a hardenable matrix material. Thereafter the fibers can be applied, e.g. by winding, possibly followed by a further soaking step. Depending on the fiber type and matrix material one of these soaking methods may be advantageous.

Due to the liquid aggregate state of the matrix material the latter can penetrate into layers thereunder. Herein an additional micro-clamping between the layers results so that an additional adhesion is reached.

In addition by the application method that is used in step S14 the tension ratio between the individual layers can be determined in a preferred way. When applying the fiber-reinforced plastic layer, a pressure tension can be generated (for instance by winding the fiber layer with a certain tensile stress), which acts from the outside onto the inner, thermally sprayed functional layer. In this way the functional layer that is sensitive to tensile stress is biased with pressure so that in total a significantly increased strength of the final composite material component results. The bias generated during winding during the subsequent hardening of the matrix material is secured within the fiber-reinforced plastic layer, and is thus kept permanently.

The fiber-reinforced plastic layer may have a layer thickness von ≥500 μm, preferably of ≥700 μm, in particular preferred of about ≥900 μm, wherein the thickness preferably is 5 cm at the most. Depending on the application purpose of the composite material component a particularly thin layer may be advantageous.

After applying at least two layers onto the negative form, the method step S16 is carried out. Herein the matrix material is hardened. The hardening may be facilitated for instance by increased temperatures, by special additions into the matrix material or by increased pressures onto the fiber-reinforced plastic layer. By the hardening of the matrix material a micro-clamping within the layers into which the matrix material could penetrate, results. In addition the fibers are fixed within the matrix material.

In the final method step S18 the composite material component is released from the negative form to thereby obtain the final composite material component. For instance the release may be facilitated by means of cooling the negative form.

During release it should be ensured that the functional layer is fully detached from the negative form. Apart from the cooling this is also influenced by the selection of the material and by the surface treatment of the negative form. In addition by setting the surface roughness, the detachment can in addition be facilitated; particularly smooth structures are preferred herein.

EXAMPLES

Figure 2:
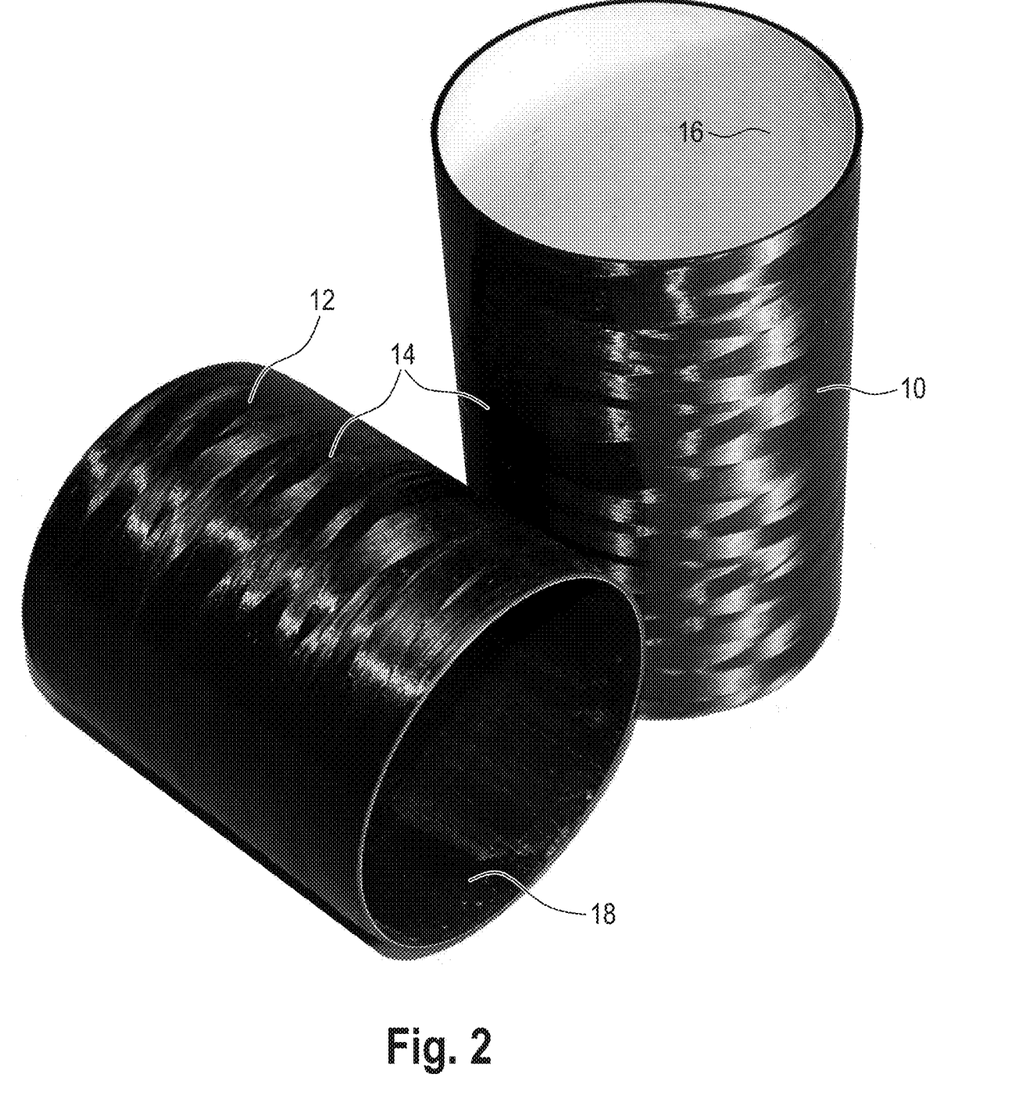
FIG. 2 two composite material components produced according to the invention.

FIG. 2 shows two composite material components 10 and 12 there were produced according to the method of the invention. Herein two tubes 10 and 12 having an inner diameter of 100 mm and an outer diameter of 103.2 mm, or 104 mm, respectively, are provided. The inner diameter of the tubes herein corresponds to the outer diameter of the negative form. The outer layer of the tubes forms the fiber-reinforced plastic layer 14. Commercial carbon fibers (Toray T700SC 12K 50C of the company Toray, Neu-Isenburg, Germany) were used as fibers, and an epoxy resin (Epoxidresin L+Hardener EPH 161 Poxy Systems of the company R&G, Waldenbuch, Germany) was used as matrix material. The thermally sprayed functional layer on the one hand consisted of aluminum oxide 16 (bright inner coating) ($Al_2O_3$ 99.7%, molten powder, −20+5 μm, of the company Ceram GmbH Ingenieurkeramik, Albbruck, Germany), and on the other hand of titanium oxide 18 (dark inner coating) ($TiO_2$ 99%, molten powder, −38+15 μm, of the company Ceram GmbH lngenieurkeramik, Albbruck, Germany). Both tubes 10, 12 had a thermally sprayed adhesion agent layer (not visible). In both cases aluminum (aluminum 99%, powder, spray aeriated, −75+45 μm, Metco 54NS-1 of the company Oerlikon Management AG, Pfäffikon, Switzerland) was used.

In both cases tubes of 6060 aluminum alloy were used as negative form. These were 400 mm long, having an outer diameter of 100 mm and a wall thickness of 3 mm. The core surface of the negative form before the application of the functional layer was ground (using P800, P1200, and P2000 grinding paper) and polished (universal polishing paste of the company R&G, Waldenbuch, Germany).

The application of the functional layer as well of the adhesion agent layer onto the negative form was done by means of atmospheric plasma spraying (APS). Herein an APS burner F6 of the company GTV Verschleißschutz GmbH, Luckenbach, Germany was used. The selected parameters are summarized in the following table 1.

TABLE 1

|  | Functional layer ($Al_2O_3$); molten powder | Functional layer ($TiO_2$); molten powder | Adhesion agent layer (Al); gas aeriated powder |
|---|---|---|---|
| Plasma gases: | | | |
| Ar | 44 L/min | 46 L/min | 45 L/min |
| $H_2$ | 12 L/min | 8 L/min | 6 L/min |

TABLE 1-continued

|  | Functional layer ($Al_2O_3$); molten powder | Functional layer ($TiO_2$); molten powder | Adhesion agent layer (Al); gas aeriated powder |
|---|---|---|---|
| Current strength (I) | 600 A | 500 A | 470 A |
| Powder transportation: |  |  |  |
| Ar (carrier gas) | 6 L/min | 6 L/min | 6 L/min |
| rotation of turntable (rpm) | 1.8 rpm | 2.0 rpm | 1.2 rpm |

Figure 3:
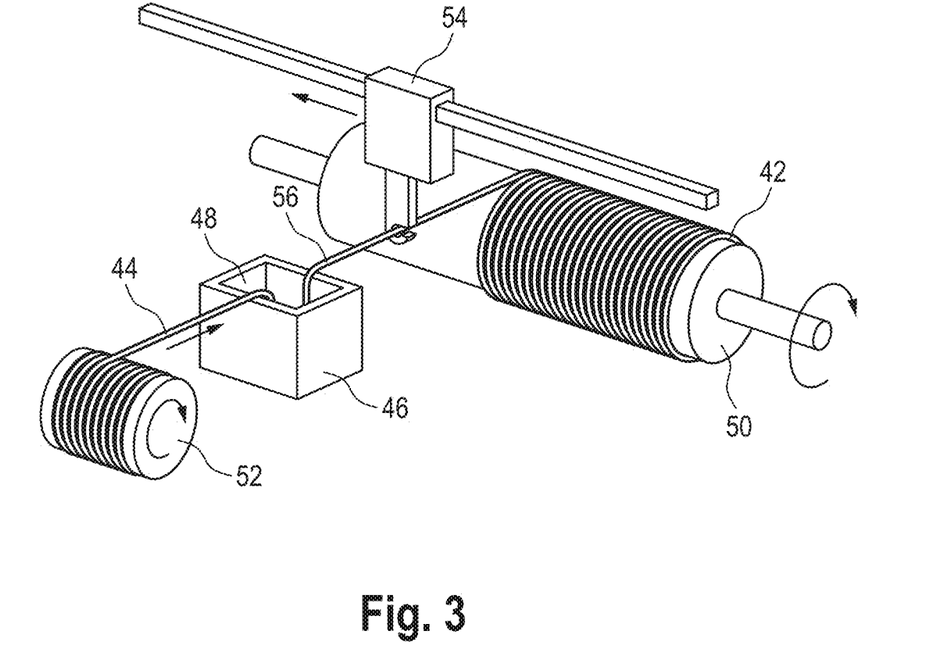
FIG. 3 a fiber winding apparatus.

The application of the fiber-reinforced plastic layer was performed by means of a fiber winding method (cf. FIG. 3). Herein two fiber layers were applied unidirectionally, and two fiber layers had an angle of 80°. The fiber pre-tension was 6 N, the winding breadth corresponded to the tube length of about 180 mm.

After applying the layers the resin was hardened for 24 h at room temperature and for further 16 hours at 65° C.

The release of the final composite material from the negative form was facilitated by means of cooling. To this end the aluminum core of the negative form was cooled from the inside using two $CO_2$ lances (TSF nozzles, Linspray, of the company Linde, Pullach, Germany) for 5 min. During the $CO_2$ cooling a dry ice-gas mixture was sprayed onto the component at a temperature of about −73° C. An ejection/retraction of the final composite material was facilitated by the strong contraction of the aluminum core.

The layer thicknesses of the individual layers of the two tubes 10 and 12 are summarized in the subsequent table 2.

TABLE 2

|  | Bright inner coating | Dark inner coating |
|---|---|---|
| Functional layer | 260 μm ($Al_2O_3$) | 160 μm ($TiO_2$) |
| Adhesion agent layer | 140 μm (Al) | 140 μm (Al) |
| Fiber-reinforced plastic layer | 1.6 mm | 1.3 mm |

FIG. 3 shows a fiber winding method 40 which was used during the production of the composite materials according to FIG. 2. This method allows for an application of a fiber layer 42, wherein the fibers 44 initially were drawn through a bath 46 of liquid matrix material 48. Herein the fibers 44 are soaked. The matrix material 48 may be a resin. For this method cylindrical, conical, spherical or any other shape of the negative form 50 is suitable.

During the method the negative form 50 is rotated, so that the fiber 44 can be wound around the coated negative form 50 and can be simultaneously drawn from a supply coil 52. The fiber 44 is under pre-tension and is guided through an impregnating unit, the bath 46 that is filled with matrix material 48. The location of the soaked fibers 56 on the coated negative form 50 is control by means of a guiding unit 54.

Figure 4:
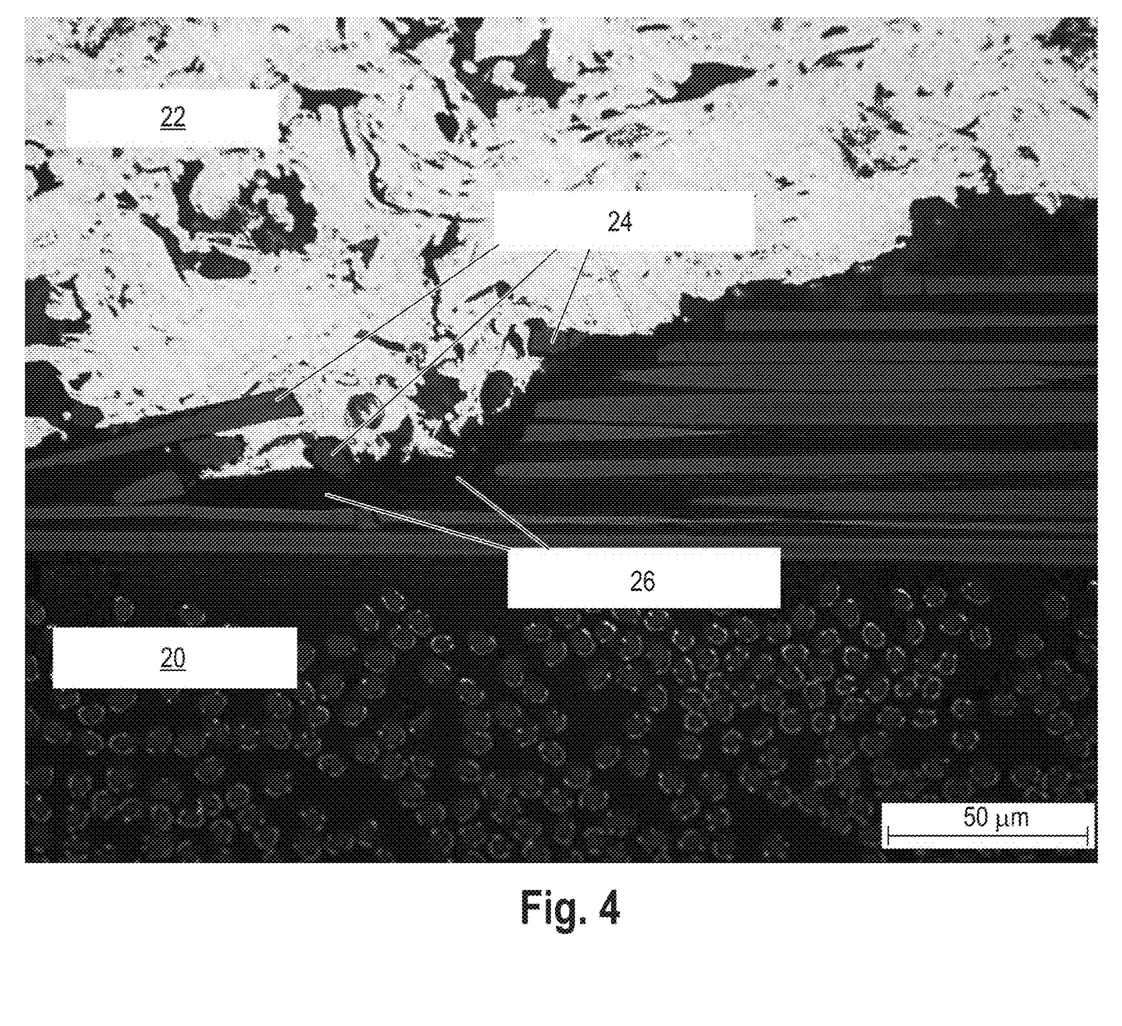
FIG. 4 a light microscopic picture of a cross section of a fiber-reinforced coated plastic manufactured according to the prior art.

FIG. 4 shows a picture taken by light microscopy of a cross section of a commercial fiber-reinforced plastic material which was coated using the conventional method. This consists of two layers: one fiber-reinforced plastic layer 20 and a metallic adhesion agent layer 22 made of aluminum (the application of a further layer was dispensed with). The plastic was produced according to the conventional method. This method contained the method steps: 1. providing a fiber-reinforced plastic material; 2. surface activating by means of sand blasting; and 3. applying an adhesion agent layer by means of thermal spraying.

The damages 24 and 26 within the fiber-reinforced plastic layer can clearly be seen. These damages were generated by the surface activation by means of sandblasting and by the application of the adhesion agent layer. Apart from the carbon fiber breakouts 24 also disintegrations 26 in the region of the polymer matrix can be seen. The carbon fiber breakouts 24 result from the surface activation. Herein the surface is roughened and thus increased. The roughening has the purpose to improve the mechanical anchoring of the coating. However, as shown here, damages of the fiber-reinforced plastic layer result. The disintegrations 26 within the polymer matrix primarily result from the coating method. During thermal spraying particularly high temperatures are used. During impact of the metallic adhesion agent layer onto the matrix layer disintegration reactions occur.

Figure 5:
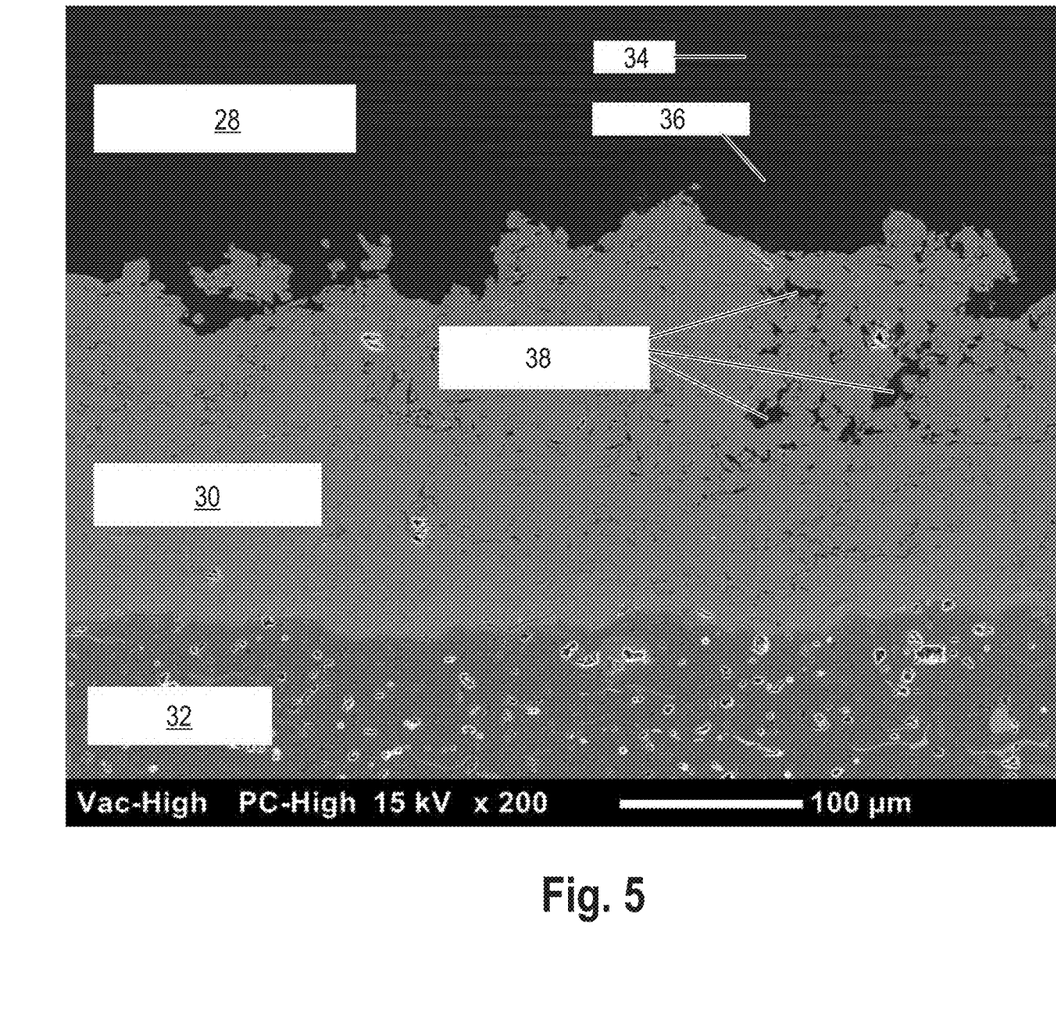
FIG. 5 am SEM picture of a cross section of a composite material component produced according to the invention.

FIG. 5 shows an SEM photo of a cross section of a composite material according to the invention. This comprises three layers: one fiber-reinforced plastic layer 28, one adhesion agent layer 30, and a functional layer 32.

The preparation of this composite material (tube) was done almost in analogy to the method described with reference to FIG. 2, wherein departing therefrom as a functional layer a ceramic layer of $Al_2O_3/TiO_2$ (97%/3%) was applied by means of APS. The inner diameter of the tube was 100 mm, and the outer diameter 101.4 mm. The outer layer of the tube forms the fiber-reinforced plastic layer 28. As fibers 34 commercial carbon fibers (Toray T700SC 12K 50C of the company Toray, Neu-Isenburg, Germany) were utilized, and as a matrix material an epoxy resin (epoxy resin L+hardnener EPH 161 Poxy Systems of the company R&G, Waldenbuch, Germany) was used. As a material for the functional layer aluminum oxide/titanium oxide 32 ($Al_2O_3/TiO_2$ 97%/3% molten powder, −40+10 μm, of the company GTV Implex GmbH, Luckenbach, Germany) was used. As an adhesion agent layer 30 aluminum was used (aluminum 99%, gas aeriated powder, −75+45 μm, Metco 54NS-1 of the company Oerlikon Management AG, Pfäffikon, Switzerland).

As a negative form the tube as mentioned above was used.

The application of the functional layer as well as of the adhesion agent layer onto the negative form was performed by means of atmospheric plasma spraying (APS). Herein an APS burner F6 of the company GTV Verschleißschutz GmbH, Luckenbach, Germany was used. The parameters that were used are summarized in the following table 3.

TABLE 3

|  | Functional layer ($Al_2O_3/TiO_2$); molten powder | Adhesion agent layer (Al): gas-aeriated powder |
|---|---|---|
| Plasma gases: |  |  |
| Ar | 44 L/min | 45 L/min |
| $H_2$ | 12 L/min | 6 L/min |
| Current strength (I) | 600 A | 470 A |
| Powder transportation: |  |  |
| Ar (carrier gas) | 6 L/min | 6 L/min |
| Rotation of turntable (rpm) | 1.8 rpm | 1.2 rpm |

The application of the fiber-reinforced plastic layer was performed by means of a fiber winding method (see FIG. 3). Herein two fiber layers were applied unidirectionally and two fibers has an angle of 80°. The filament pre-tension results from the application onto the fiber coil and by the respective braking force. The braking force was 6 N, the winding breadth corresponded to the tube length of about 180 mm.

After applying the layers the resin was hardened for 24 h at room temperature and for further 16 h at 65° C.

The detachment of the final composite material from the negative form (cylindrical, without any conical shape) was facilitated by means of cooling. To this end the aluminum core of the negative form was cooled from the inside for 5 min with two CO2 lances (TSF nozzles, Linspray of the company Linde, Pullach, Germany). The layer thicknesses of the individual layers are summarized within the subsequent table 4.

TABLE 4

| | |
|---|---|
| Functional layer | 200 μm ($Al_2O_3/TiO_2$) |
| Adhesion agent layer | 180 μm (Al) |
| Fiber-reinforced plastic layer | 0.9 mm |

In the SEM photograph of FIG. 5 no damages between the individual layers can be seen, by contrast to FIG. 4. Instead from FIG. 5 it can be taken that the polymer matrix 36 according to the method according to the invention is infiltrated into the layer thereunder (adhesion agent layer 40), and thus an additional micro-clamping 38 of the individual layers results.

To investigate the particular characteristics of the composite material component (according to example of FIG. 5) several measurements were performed. Herein inter alia it was investigated, which surface roughness of the negative form is particularly preferred and which adhesion strength can be produced by the method according to the invention. The production of the composite materials was performed as described in the example with respect to FIG. 5, as far as not indicated differently.

Characterization

1. Determination of Surface Characteristics

First it was investigated which surface roughness of the negative form is particularly preferred. To this end a negative form made of stainless steel and another five negative forms made of aluminum were produced and finish treated in different ways. The negative form in all cases had an outer diameter of 100 mm. The surfaces of the individual negative forms were measured before producing a tube coated on the inside (according to example of FIG. 5) using white light interferometry. The measurement was performed using the measurement device "Contour GT-K" of the company Bruker, Billerica, USA. Using the assigned software "Vision 64" the surface characteristics $S_a$ and $S_z$ were computed. The following measurements were obtained according to table 5:

TABLE 5

| Finish treatment | $S_a$ [μm] | $S_z$ [μm] |
|---|---|---|
| Stainless steel core, untreated | 4.68 | 38.11 |
| Aluminum core, blasted and polished with 1200 | 2.92 | 37.62 |
| Aluminum core, polished and blasted | 1.43 | 40.83 |
| Aluminum core, machine-polished, re-used | 0.59 | 9.36 |
| Aluminum core, machine-polished | 0.63 | 5.12 |
| Aluminum core, machine-polished and hand-polished | 0.57 | 4.46 |

After the individual composite material component had been produced according to the method described above, it was found that the composite material components can be released from the negative form particularly well, if the surface roughness of the negative form has surface characteristics of $S_a \leq 3.5$ μm and $S_z \leq 50$ μm.

2. Adhesion Tensile Strength

For the next measurements again a tube coated on the inside was produced. The production was done according to FIG. 5. In the experiment the adhesion tensile strength of the individual layers was investigated by means of a stamp retraction investigation. The method was performed along the lines of DIN EN 582. To this end the functional layer ($Al_2O_3/TiO_2$; 97%/3%) of the composite material component a stamp glued-on (so-called test stamp) was withdrawn evenly and slowly using a tension test machine perpendicularly to the surface until breakaway (rupture) occurred.

As the retraction device the model "PAT (Precision Adhesion Testing Equipment) AT101E" of the company DFD Instruments Woking, United Kingdom, was utilized. As a stamp diameter Ø8.16 mm was used, wherein the face surface was built convexly onto Ø100 mm, to rest at the tube bending matingly. As an adhesive "Loctite EA 9466" was used.

In the experiment adhesive strengths >17 MPa were measured. Such values are not known from comparable, conventional composite materials having thermally sprayed functional layers. With conventional composite materials only maximum adhesive strengths of 13 MPa were measured, however, usually <10 MPa.

In the experiment it was also found that the ruptures almost exclusively were located within the ceramic layer ($Al_2O_3/TiO_2$); thus within the outer functional layer. Thus only cohesion ruptures within the outermost layer occur. However, the other layers usually remain intact. Using the method according to the invention thus a particularly good adhesion between the fiber-reinforced plastic and the adhesion agent layer is reached.

What is claimed is:

1. A method for producing a composite material component comprising the following steps:
   (a) providing a negative form;
   (b) finish treating said negative form at said surface thereof so that said surface of said negative form has a surface characteristic Sa≤5 μm and a surface roughness characteristic of Sz≤80 μm;
   (b1) cooling said negative form;
   (c) applying at least one functional layer by means of thermal spraying onto said negative form;
   (c1) applying an adhesion agent layer consisting of a metal or metal alloy;
   (d) applying at least one fiber-reinforced plastic layer including a hardenable matrix material;
   (e) hardening said matrix material; and
   (f) releasing said composite material component, comprising the at least one functional layer and the at least one fiber-reinforced plastic layer, from said negative form to thereby obtain the composite material component;
   wherein said step (b) is performed after said step (a) and before said step (c);
   wherein step (c1) is performed after said step (c) and before step (d);
   wherein said negative form is made of a material which is selected from the group consisting of metals, metal alloys, ceramics, salts and glasses; and
   wherein said material of said negative form and said functional layer are selected so that a difference (Δα) of said coefficients of thermal expansion between said material of said negative form and said functional layer is smaller than $1 \cdot 10^{-4}$/K.

2. The method of claim 1, wherein said finish treatment within step (b) is performed so that said surface of said negative form has a surface characteristic Sa≤3.5 μm, and a surface roughness characteristic of Sz≤50 μm.

3. The method of claim 1, wherein said material of said negative form and said functional layer is selected so that said difference (Δα) of said coefficients of thermal expansion between said material of said negative form and said functional layer is larger than $1 \cdot 10^{-6}$/K.

4. The method of claim 3, wherein said material of said negative form and said functional layer is selected so that said difference (Δα) of said coefficients of thermal expansion between said material of said negative form and said functional layer is larger than $10 \cdot 10^{-6}$/K.

5. The method of claim 1, wherein said negative form before applying at least one functional layer by means of thermal spraying is pre-heated.

6. The method of claim 1, wherein said negative form before applying at least one functional layer by means of thermal spraying is pre-heated to a temperature of at least 100° C.

7. The method of claim 1, wherein said adhesion agent layer consists of a metal selected from the group consisting of aluminum, nickel, steel, zinc, titanium, molybdenum, chromium, cobalt, silicon, alloys, and mixtures thereof.

8. The method of claim 1, wherein said functional layer is applied with a thickness of 20 to 1000 μm.

9. The method of claim 1, wherein said functional layer applied in step (c) is selected from the group consisting of a ceramic layer, a cermet layer, and a metal layer.

10. The method of claim 1, wherein said fiber-reinforced plastic material comprises fibers that are selected from the group consisting of organic fibers, inorganic fibers, metallic fibers, natural fibers, and mixtures thereof.

11. The method of claim 1, wherein said fibers are soaked within a hardenable matrix material.

12. The method of claim 1, wherein said matrix material is selected from the group consisting of resins, polymers, and mixtures thereof.

13. The method of claim 1, wherein said fiber-reinforced plastic layer is applied with a thickness of ≥500 μm.

14. A method for producing a composite material component comprising the following steps:
(a) providing a negative form;
(b) finish treating said negative form at the surface thereof so that said surface of said negative form has a surface characteristic Sa≤5 μm and a surface roughness characteristic of Sz≤80 μm;
(c) applying at least one functional layer by means of thermal spraying onto said negative form;
(c1) applying an adhesion agent layer consisting of a metal or metal alloy;
(d) applying at least one fiber-reinforced plastic layer including a hardenable matrix material;
(e) hardening of said matrix material; and
(f) releasing said composite material component, comprising the at least one functional layer and the at least one fiber-reinforced plastic layer, from said negative form to thereby obtain the composite material component, wherein said step (b) is performed after said step (a) and before said step (c);

wherein step (c1) is performed after step (c) and before step (d);

wherein said negative form is made of a material which is selected from the group consisting of metals, metal alloys, ceramics, salts and glasses; and wherein said material of said negative form and said functional layer are selected so that a difference (Δα) of said coefficients of thermal expansion between said material of said negative form and said functional layer is smaller than $1 \cdot 10^{-4}$/K.

* * * * *